(12) United States Patent
Escuti et al.

(10) Patent No.: US 8,305,523 B2
(45) Date of Patent: Nov. 6, 2012

(54) MULTI-LAYER ACHROMATIC LIQUID CRYSTAL POLARIZATION GRATINGS AND RELATED FABRICATION METHODS

(75) Inventors: Michael James Escuti, Cary, NC (US); Chulwoo Oh, Los Angeles, CA (US)

(73) Assignee: North Carolina State University, Raleigh, NC (US)

( * ) Notice: Subject to any disclaimer, the term of this patent is extended or adjusted under 35 U.S.C. 154(b) by 247 days.

(21) Appl. No.: 12/596,176

(22) PCT Filed: Apr. 16, 2008

(86) PCT No.: PCT/US2008/004897
§ 371 (c)(1),
(2), (4) Date: Apr. 27, 2010

(87) PCT Pub. No.: WO2008/130561
PCT Pub. Date: Oct. 30, 2008

(65) Prior Publication Data
US 2010/0225856 A1 Sep. 9, 2010

Related U.S. Application Data

(60) Provisional application No. 60/912,039, filed on Apr. 16, 2007.

(51) Int. Cl.
*G02B 5/30* (2006.01)
(52) U.S. Cl. .................................................. 349/96
(58) Field of Classification Search ................. None
See application file for complete search history.

(56) References Cited

U.S. PATENT DOCUMENTS

| | | |
|---|---|---|
| 5,245,596 A | 9/1993 | Gupta et al. |
| 7,692,759 B2 * | 4/2010 | Escuti et al. .......... 349/201 |
| 2002/0180912 A1 | 12/2002 | Hsieh et al. |
| 2005/0140837 A1 | 6/2005 | Crawford et al. |
| 2008/0278675 A1 * | 11/2008 | Escuti et al. .......... 349/201 |

(Continued)

FOREIGN PATENT DOCUMENTS

EP 0525478 A2 2/1993

(Continued)

OTHER PUBLICATIONS

European Communication Corresponding to European Application No. 11 178 032; Dated: Oct. 7, 2011; 10 pages.

(Continued)

*Primary Examiner* — Tina Wong
(74) *Attorney, Agent, or Firm* — Myers Bigel Sibley & Sajovec, P.A.

(57) ABSTRACT

A multi-layer polarization grating includes a first polarization grating layer, a second polarization grating layer on the first polarization grating layer, and a third polarization grating layer on the second polarization grating layer, such that the second polarization grating layer is between the first and third polarization grating layers. The second polarization grating layer has a periodic molecular structure that is offset relative to that of the first polarization grating layer along an interface therebetween. The third polarization grating layer may also have a periodic molecular structure that is offset relative to that of the second polarization grating layer along an interface therebetween. As such, the periodic molecular structures of the first and second polarization grating layers may be out of phase by a first relative angular shift, and the periodic molecular structures of the second and third polarization grating layers may be out of phase by a second relative angular shift. Related fabrication methods are also discussed.

30 Claims, 5 Drawing Sheets

U.S. PATENT DOCUMENTS

| | | | |
|---|---|---|---|
| 2010/0171909 A1* | 7/2010 | Handschy | 349/98 |
| 2011/0188120 A1 | 8/2011 | Tabirian et al. | |
| 2011/0262844 A1 | 10/2011 | Tabirian et al. | |

FOREIGN PATENT DOCUMENTS

| | | |
|---|---|---|
| EP | 0632311 A1 | 1/1995 |
| WO | WO 2006/092758 A2 | 9/2006 |

OTHER PUBLICATIONS

First Office Action corresponding to Chinese Patent Application No. 2008-80012098.5; Date of Issue: Mar. 17, 2011; 16 pages.

First Office Action corresponding to Chinese Patent Application No. 2008-80012188.4; Date of Issue: Mar. 7, 2011; 8 pages.

Communication pursuant to Article 94(3) EPC corresponding to European Application No. 08 742 943.7 dated Apr. 8, 2011; 4 pages.

Communication pursuant to Article 94(3) EPC corresponding to European Application No. 08 742 945.2 dated Apr. 8, 2011; 4 pages.

Examination Report corresponding to European Patent Application No. 08742945.2 dated Jun. 4, 2010.

Examination Report corresponding to European Patent Application No. 08742939.5 dated Jun. 4, 2010.

Jones et al., *P-209: Evaluation of Projection Schemes for the Liquid Crystal Polarization Grating Operating on Unpolarized Light*; 2006 SID International Symposium, Society for Information Display; vol. XXXVI, pp. 1015-1017, May 24, 2005.

Dozov et al., *Planar Degenerated Anchoring of Liquid Crystals Obtained by Surface Memory Passivation*, Applied Physics Letters, AIP, American Institute of Physics, vol. 77, No. 25; pp. 4124-4126, Dec. 18, 2000.

Zhan et al., *Polarization Properties of Inversely twisted Nematic Liquid-Crystal Gratings*; Applied Optics Society of America, vol. 37, No. 28, pp. 6755-6763, Oct. 1, 1998.

Zhang et al. *Application of Photoalignment Technology to Liquid-Crystal-on-Silicon Microdisplays*; Japanese Journal of Applied Physics, vol. 44, No. 6A, pp. 3983-3991, (2005).

Sieberle, et al., *Photoalignment of LCoS LCDs*, Journal of the Society for Information Display, vol. 10, No. 1, pp. 31-35, (2002).

Zhang et al., *Silicon Microdisplay with Photo-alignment*, IEEE, Optoelectronics, Proceedings of the Sixth Chinese Symposium, pp. 228-230, Sep. 12-14, 2003.

Escuti et al., *39.4: Polarization-Independent Switching with High Contrast from a Liquid Crystal Polarization Grating*; Society for Information Display, vol. XXXVII, pp. 1443-1446, May 24, 2005.

Oh et al., *P-167 FDTD and Elastic Continuum Analysis of the Liquid Crystal Polarization Grating, g*; Society for Information Display, vol. XXXVII, pp. 844-847, May 24, 2005.

Avrutsky, et al., *High-Efficiency Single-Order Waveguide Grating Coupler*, Optical Society of America, vol. 15., No. 24; pp. 1446-1448, Dec. 15, 1990.

Crawford et al., *Liquid-Crystal Diffraction Gratings Using Polarization Holography Alignment Techniques*, Journal of Applied Physics, vol. 98, No. 12, pp. 123102-1-123102-10; Dec. 27, 2005.

Oh et al., *L-6: Late-News Paper: Achromatic Diffraction Using Reactive Mesogen Polarization Gratings*, Society for Information Display, vol. XXXVIII, pp. 1401-1404, May 20, 2007.

Lu et al., *Low Voltage and Wide-Viewing-Angle Twisted Nematic Liquid Crystal Displays by Optical Compensation*, Japanese Journal of Applied Physics, vol. 39, No. 5A, Part 2; pp. L412-L415, May 1, 2000.

International Search Report, PCT/US2008/004897 and Written Opinion; Jul. 2, 2008.

International Preliminary Report on Patentability; May 8, 2009.

Summons to Attend Oral Proceedings Pursuant to Rule 115(1) EPC issued in Corresponding European Application No. 08742945.2; Dated: Feb. 21, 2012; 10 pages.

Pancharatnam S; "Achromaic Combinations of Birepringent Paltes—Part I.: An Achromatic circular polarizer", Proceedings of The Indian Academy of Sciences. Section B, Biological Sciences, Indian Academy of Sciences, Bangalore, IN; vol. 41, Mar. 1 1955; pp. 130-136.

Second Office Action issued in corresponding Chinese Patent Application No. 200880012154.5; Dated: Mar. 28, 2012; 8 pages.

* cited by examiner

FIG. 1A

In-Plane Nematic Director Profiles

MULTI-LAYER ACHROMATIC LIQUID CRYSTAL POLARIZATION GRATINGS AND RELATED FABRICATION METHODS

CLAIM OF PRIORITY

The present application is a 35 U.S.C.§371 national phase application of PCT international Application No. PCT/US2008/004897, entitled "Multi-Layer Achromatic liquid Crystal Polarization Gratings and Fabrications Methods", having an international filing date of Apr. 16, 2008, and claims priority to U.S. Provisional Patent Application No. 60/912,039, entitled "Multi-Layer Achromatic Liquid Crystal Polarization Gratings and Fabrication Methods", filed Apr. 16, 2007, the disclosures of which are hereby incorporated herein by reference as if set forth in their entireties. The above PCT International Application was published in the English language and has International Publication No. WO 2008/130,561.

FIELD OF THE INVENTION

The present invention relates to polarization gratings and related methods of fabrication.

BACKGROUND OF THE INVENTION

Liquid crystals may include liquids in which an ordered arrangement of molecules exists. Typically, liquid crystal (LC) molecules may be anisotropic, having either an elongated (rod-like) or flat (disk-like) shape. As a consequence of the ordering of the anisotropic molecules, a bulk LC often exhibits anisotropy in its physical properties, such as anisotropy in its mechanical, electrical, magnetic, and/or optical properties.

As a result of the rod-like or disk-like nature, the distribution of the orientation of LC molecules may play an important role in optical applications, such as in liquid crystal displays (LCDs). In these applications, LC alignment may be dictated by an alignment surface. The alignment surface may be treated so that the LC aligns relative to the surface in a predictable and controllable way. In many cases, the alignment surface may ensure a single domain through the LC device. In the absence of a treated alignment surface, the LC may have many domains and/or many discontinuities in orientation. In optical applications, these domains and discontinuities may cause scattering of light, leading to a degradation in the performance of the display.

Polarization gratings may be used to periodically affect the local polarization state of light traveling therethrough (as opposed to affecting the phase or amplitude as in conventional gratings). For example, switchable liquid crystal polarization gratings (LCPGs) can be used to implement an intensity modulator that can operate on unpolarized light. More particularly, such switchable LCPGs may be used to achieve relatively high contrast modulation of unpolarized light with a relatively narrow bandwidth (such as a laser), for example, in applications including projection displays and light-shutters. For instance, some conventional LCPGs may modulate monochromatic light with a contrast ratio of greater than about 200:1 in the $0^{th}$-order for light having a bandwidth of <7% of the center wavelength. However, the contrast modulation of conventional LCPGs may degrade when applied to modulate broadband light (such as from some LEDs), which may be important in many applications.

SUMMARY OF THE INVENTION

According to some embodiments of the present invention, a multi-layer polarization grating includes a first polarization grating layer, a second polarization grating layer on the first polarization grating layer, and a third polarization grating layer on the second polarization grating layer such that the second polarization grating layer is between the first and third polarization grating layers. The second polarization grating layer has a second periodic molecular structure that is offset relative to a first periodic molecular structure of the first polarization grating layer along an interface between the first and second polarization grating layers.

In some embodiments, the third polarization grating layer may have a third periodic molecular structure that is offset relative to the second periodic molecular structure of the second polarization grating layer along an interface between the second and third polarization grating layers. The periodic molecular structures of the first and second polarization grating layers may be out of phase by a first relative angular shift, and the periodic molecular structures of the second and third polarization grating layers may be out of phase by a second relative angular shift. For example, a local nematic director orientation in the second polarization grating layer may have the first angular shift relative to a local nematic director orientation the first polarization grating layer, and a local nematic director orientation in the third polarization grating layer may have the second angular shift relative to the local nematic director orientation in the second polarization grating layer.

In other embodiments, the third periodic molecular structure may be oppositely offset relative to the second periodic molecular structure along the interface between the second and third polarization grating layers. For example, the second angular shift may be an opposite angle than the first angular shift such that the first and third periodic molecular structures may be in-phase. The first angular shift may be greater than 0° but less than 180°. For instance, the first angular shift may be about +55° to about +56°, and the second angular shift may be about −55° to about −56°. In other embodiments, the third periodic molecular structure of the third polarization grating layer may be out of phase relative to the first periodic molecular structure of the first polarization grating layer.

In some embodiments, the multi-layer polarization grating may further include a first chiral polymerizable liquid crystal layer on the first polarization grating layer between the first polarization grating layer and the second polarization grating layer. The first chiral polymerizable liquid crystal layer may be configured to shift the second periodic molecular structure of the second polarization grating layer relative to the first periodic molecular structure of the first polarization grating layer by the first angular shift.

In other embodiments, the multi-layer polarization grating may further include a second chiral polymerizable liquid crystal layer on the third polarization grating layer between the third polarization grating layer and the second polarization grating layer. The first and second chiral polymerizable liquid crystal layers may respectively include chiral molecules therein. The chiral molecules of the second chiral polymerizable liquid crystal layer may be of an opposite handedness than the chiral molecules of the first chiral polymerizable liquid crystal layer, such that the second chiral polymerizable liquid crystal layer may be configured to oppositely shift the third periodic molecular structure of the third polarization grating layer relative to the second periodic molecular structure of the second polarization grating layer by the second angular shift.

In some embodiments, the first chiral polymerizable liquid crystal layer may have about a +55 degree twist over a thickness between opposing faces thereof, and the second chiral polymerizable liquid crystal layer may have about a −55 degree twist over a thickness between opposing faces thereof.

In other embodiments, the multi-layer polarization grating may further include a first substrate including a first electrode on the first polarization grating layer, and a second substrate including a second electrode on the third polarization grating layer. The second polarization grating layer may be a non-reactive liquid crystal layer. For example, the second polarization grating layer may be a nematic liquid crystal layer.

In some embodiments, the second polarization grating layer may be a polymerizable liquid crystal layer.

According to further embodiments of the present invention, a method of fabricating a multi-layer polarization grating includes forming a first polarization grating layer, forming a second polarization grating layer on the first polarization grating layer, and forming a third polarization grating layer on the second polarization grating layer such that the second polarization grating layer is between the first and third polarization grating layers. The second polarization layer has a second periodic molecular structure that is offset relative to a first periodic molecular structure of the first polarization grating layer along an interface between the first and second polarization grating layers.

In some embodiments, the third polarization grating layer may have a third periodic molecular structure that is offset relative to the second periodic molecular structure along an interface between the second and third polarization grating layers. The second polarization grating layer may be formed such that periodic molecular structures of the first and second polarization grating layers may be out of phase by a first relative angular shift. The third polarization grating layer may be formed such that periodic molecular structures of the second and third polarization grating layers may be out of phase by a second relative angular shift. For example, a local nematic director orientation in the second polarization grating layer may have the first angular shift relative to a local nematic director orientation the first polarization grating layer, and a local nematic director orientation in the third polarization grating layer may have the second angular shift relative to the local nematic director orientation in the second polarization grating layer.

In other embodiments, the third polarization grating layer may be formed on the second polarization grating layer such that the third periodic molecular structure is oppositely offset relative to the second periodic molecular structure along the interface between the second and third polarization grating layers. For example, the second angular shift may be an opposite angle than the first angular shift such that the first and third periodic molecular structures may be in-phase. The first angular shift may be greater than 0° but less than 180°. For instance, the first angular shift may be about +55° to about +56°, and the second angular shift may be about −55° to about −56°. In other embodiments, the third polarization grating layer may be formed such that the third periodic molecular structure may be out of phase relative to the first periodic molecular structure of the first polarization grating layer.

In some embodiments, a first chiral polymerizable liquid crystal layer may be formed on the first polarization grating layer prior to forming the second polarization grating layer thereon. The first chiral polymerizable liquid crystal layer may be configured to shift the second periodic molecular structure of the second polarization grating layer relative to the first periodic molecular structure of the first polarization grating layer by the first angular shift.

In other embodiments, a second chiral polymerizable liquid crystal layer may be formed on the third polarization grating layer. The first and second chiral polymerizable liquid crystal layers may respectively include chiral molecules therein. The chiral molecules of the second chiral polymerizable liquid crystal layer may be of an opposite handedness than the chiral molecules of the first chiral polymerizable liquid crystal layer such that the second chiral polymerizable liquid crystal layer may be configured to oppositely shift the third periodic molecular structure of the third polarization grating layer relative to the second periodic molecular structure of the second polarization grating layer by the second angular shift. For example, the first chiral polymerizable liquid crystal layer may have about a +55 degree twist over a thickness between opposing faces thereof, and the second chiral polymerizable liquid crystal layer may have about a −55 degree twist over a thickness between opposing faces thereof.

In some embodiments, the second chiral polymerizable liquid crystal layer may be formed on the second polarization grating layer, and then the third polarization grating layer may be formed on the second chiral polymerizable liquid crystal layer. The second polarization grating layer may be a reactive mesogen layer.

In other embodiments, the second chiral polymerizable liquid crystal layer may be formed on the third polarization gating layer prior to forming the second polarization grating layer. The third polarization grating layer including the second chiral polymerizable liquid crystal layer thereon may be assembled adjacent the first polarization layer including the first chiral polymerizable liquid crystal layer thereon to define a gap between the first and second chiral polymerizable liquid crystal layers. The second polarization grating layer may be a non-reactive liquid crystal layer, and may be formed in the gap between the first and second chiral polymerizable liquid crystal layers such that the second periodic molecular structure of the second polarization grating layer may be shifted relative to the first periodic molecular structure by the first angular shift and may be shifted relative to the third periodic molecular structure by the second angular shift. For example, the second polarization gating layer may be a nematic liquid crystal layer.

In some embodiments, the first polarization layer may be formed on a first substrate including a first electrode, and the third polarization layer may be formed on a second substrate including a second electrode. The first substrate may be assembled adjacent the second substrate to define the gap between the first and second chiral polymerizable liquid crystal layers. The gap between the first and second chiral polymerizable liquid crystal layers may be about a half-wave retardation thickness.

Other devices and/or methods of fabrication according to some embodiments will become apparent to one with skill in the art upon review of the following drawings and detailed description. It is intended that all such additional methods and/or devices be included within this description, be within the scope of the invention, and be protected by the accompanying claims.

DETAILED DESCRIPTION OF EMBODIMENTS OF THE INVENTION

The present invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

It will be understood by those having skill in the art that, as used herein, a "transmissive" or "transparent" substrate may allow at least some of the incident light to pass therethrough. Accordingly, the transparent substrate may be a glass substrate in some embodiments. In contrast, a "reflective" substrate as described herein may reflect at least some of the incident light. Also, "polymerizable liquid crystals" may refer to relatively low-molecular weight liquid crystal materials that can be polymerized, and may also be described herein as "reactive mesogens". In contrast, "non-reactive liquid crystals" may refer to relatively low-molecular weight liquid crystal materials that may not be polymerized.

Embodiments of the present invention are described herein with reference to liquid crystal (LC) materials and polarization gratings composed thereof. As used herein, the liquid crystals can have a nematic phase, a chiral nematic phase, a smectic phase, and/or a ferroelectric phase. In addition, a number of photopolymerizable polymers may be used as alignment layers to create the polarization gratings described herein. In addition to being photopolymerizable, these materials may be inert with respect to the LC, should provide stable alignment over a range of operating temperatures of the LC device (e.g., from about −50° C. to about 100° C.), and should be compatible with manufacturing methods described herein. Some examples of photopolymerizable polymers include polyimides (e.g., AL 1254 commercially available from JSR Micro, Inc (Sunnyvale, Calif.)), Nissan RN-1199 available from Brewer Science, Inc. (Rolla, Mo.), and cinnamates (e.g., polyvinyl 4-methoxy-cinnamate as described by M. Schadt et al., in "Surface-Induced Parallel Alignment of Liquid Crystals by Linearly Polymerized Photopolymers," Jpn. J. Appl. Phys., Vol. 31 (1992), pp. 2155-2164). Another example of a photopolymerizable polymer is Staralign.™, commercially available from Vantico Inc. (Los Angeles, Calif.). Further examples include chalcone-epoxy materials, such as those disclosed by Dong Hoon Choi and co-workers in "Photo-alignment of Low-molecular Mass Nematic Liquid Crystals on Photochemically Bifunctional Chalcone-epoxy Film by Irradiation of a Linearly Polarized UV," Bull. Korean Chem. Soc., Vol. 23, No. 4, 587 (2002), and coumarin side chain polyimides, such as those disclosed by M. Ree and co-workers in "Alignment behavior of liquid-crystals on thin films of photosensitive polymers—Effects of photoreactive group and UV-exposure," Synth. Met., Vol. 117(1-3), pp. 273-5 (2001) (with these materials, the LC aligns nearly perpendicularly to the direction of polarization). Additional examples of methods of liquid crystal alignment are also discussed in and U.S. Pat. No. 7,196,758 to Crawford et al. Furthermore, some structures described herein may involve precise fabrication through a balance of spin-coating processes and liquid crystal materials. Additional structures and/or methods for use with some embodiments of the present invention are discussed in PCT Publication No. WO 2006/092758 to Escuti, et al., the disclosure of which is incorporated by reference herein in its entirety.

Some embodiments of the present invention provide methods and devices that can achieve achromatic high contrast diffraction using polarization gratings. More particularly, in some embodiments of the present invention, three polarization gratings can be laminated together to provide a predetermined phase shift therebetween. For example, a first non-reactive liquid crystal layer may be laminated between two reactive mesogen layers such that the periodic molecular orientation of the liquid crystal layer is offset by an angular shift of about 55° to about 56° relative to that of the reactive mesogen layers. Other angular shifts over a range of greater than 0° to less than 180° may also be used. Also, the angular shift between a first and second polarization grating layer may be different than the angular shift between a second and third polarization grating layer in some embodiments. As such, the grating may be switchable, and may provide a spatial-light-modulator suitable for use in a liquid crystal display (LCD). In contrast, while a single-layer polarization grating may modulate unpolarized light, its high contrast operation may be limited to very narrow input light. Accordingly, as broadband light is present in many applications, some embodiments of the present invention may be used to provide substantially higher contrast and/or brightness as compared to existing technologies.

Figure 1A:
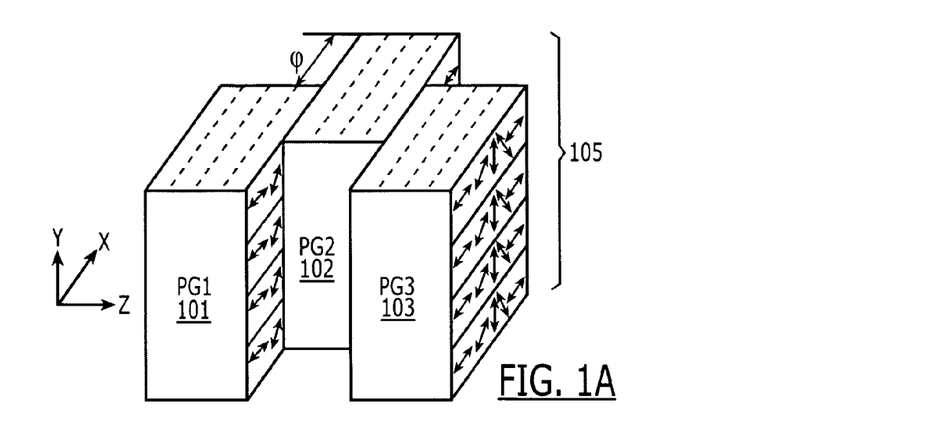
FIG. 1A is a perspective view illustrating multi-layer polarization gratings according to some embodiments of the present invention.
Figure 1B:
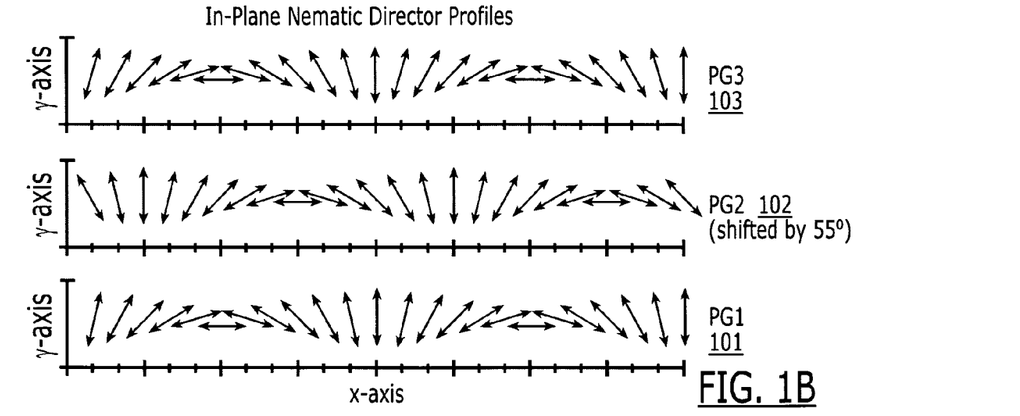
FIG. 1B is an overhead view illustrating nematic director profiles for multi-layer polarization gratings according to some embodiments of the present invention in the x-y plane.

FIG. 1A illustrates a multi-layer polarization grating according to some embodiments of the present invention. As shown in FIG. 1A, a first polarization grating layer PG1 101, a second polarization grating layer PG2 102, and a third polarization grating layer PG3 103 are laminated together to form a multi-layer structure 105. The second polarization grating layer PG2 102 is between the first and third polarization grating layers PG1 101 and PG3 103, but a periodic molecular structure of the second polarization grating layer PG2 102 is laterally offset or "shifted" relative to the periodic molecular structures of the polarization grating layers PG1 101 and/or PG3 103 along a grating vector. More particularly, the spatial difference between the second grating layer PG2 102 relative to the first and/or third grating layers PG1 101 and/or PG3 103 provides an angular shift $\phi$ of the local nematic director orientation along a plane defined by the interface between polarization grating layers. In other words, the periodic molecular structure of the middle polarization grating layer PG2 102 is shifted out of phase relative to the periodic molecular structures of at least one of the outer polarization grating layers PG1 101 and PG3 103, which may be aligned in parallel. As shown in FIG. 1B, the phase shift or angular shift $\phi$ of the nematic director orientation of the second polarization grating layer PG2 102 is about 55° in the x-y plane. The angular shift $\phi$ may be adjusted based on the relative spatial differences between the polarization grating layers PG1 101, PG2 102, and PG3 103 to increase the bandwidth of the light that may be modulated by the multi-layer structure 105. The grating pitch of each polarization grating 101, 102, and/or 103 may be about 10 micrometers (μm), and as such, the angular shift $\phi$ may be somewhat difficult to control. It should also be noted that gaps between the polarization grating layers PG1 101, PG2 102, and PG3 103 (on the order of tens of nanometers) may also affect the bandwidth of operation and/or efficiency of the multi-layer polarization grating structure 105.

Figure 2A:
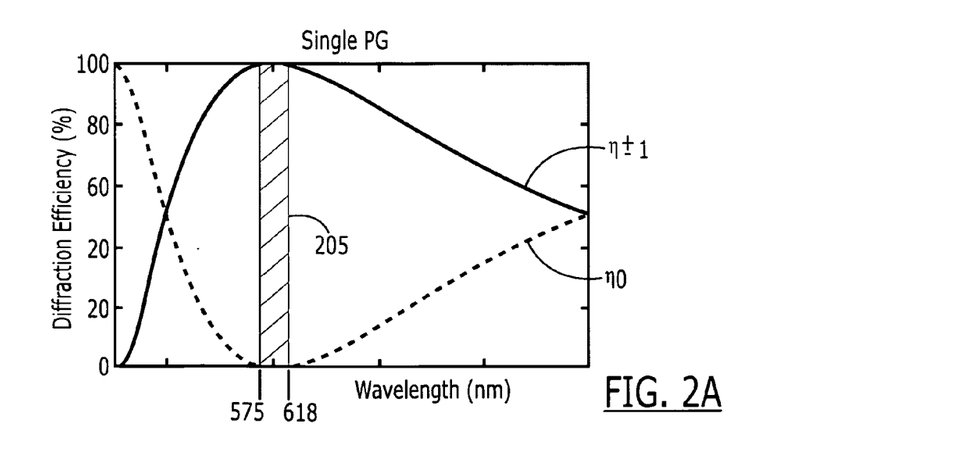
FIG. 2A is a graph illustrating the operational bandwidth of a conventional single polarization grating.
Figure 2B:
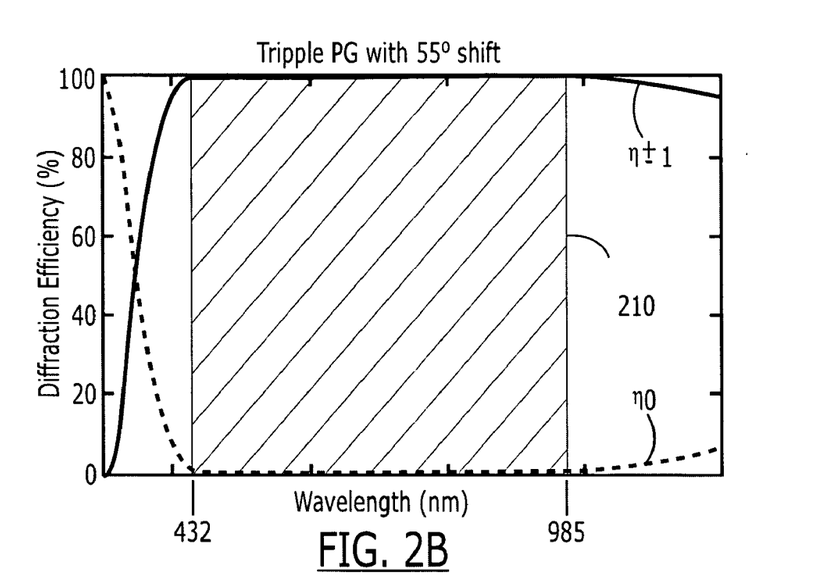
FIG. 2B is a graph illustrating the operational bandwidth of multi-layer polarization gratings according to some embodiments of the present invention.

FIGS. 2A and 2B are examples of simulation results illustrating the differences in operational bandwidth between conventional single polarization grating designs (FIG. 2A) and multi-layer polarization gratings according to some embodiments of the present invention (FIG. 2B). The simulation results of FIGS. 2A and 2B were calculated using Jones Calculus with 2×2 transfer matrix calculations, and using finite-difference time-domain (FDTD) techniques to model the optical diffraction. As shown in FIG. 2B, the bandwidth of operation of multi-layer polarization gratings according to some embodiments of the present invention may provide an increase of about 1200% as compared to the conventional single polarization grating of FIG. 2A. More particularly, the single polarization grating of FIG. 2A provides high-contrast modulation of light (for example, at an efficiency of greater than 98%) over a wavelength range of about 575 nm to about 618 nm for a desired or center wavelength $\lambda_0$ of about 633 nm, as illustrated by the shaded portion 205. However, the multi-layer polarization grating of FIG. 2B provides high-contrast modulation of light over a much greater wavelength range, i.e., from about 432 nm to about 985 nm for the same wavelength $\lambda_0$ of about 633 nm, as illustrated by the shaded portion 210. Accordingly, multi-layer polarization gratings according to some embodiments of the present invention may provide enhanced bandwidth over that of conventional polarization gratings.

Figure 3A:
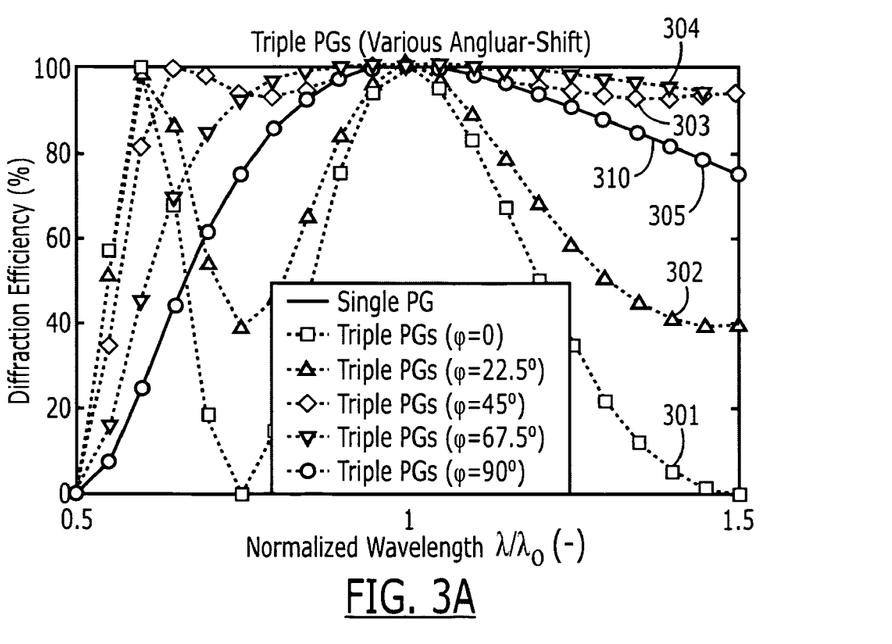
FIGS. 3-4 are graphs illustrating operational characteristics of multi-layer polarization gratings according to some embodiments of the present invention.

FIG. 3A illustrates the spectral responses of multi-layer polarization gratings according to some embodiments of the present invention for various angular shifts. More particularly, FIG. 3A illustrates the diffraction efficiency of 5 different multi-layer polarization gratings having respective angular shifts $\phi$ of 0°, 22.5°, 45°, 67.5°, and 90° (respectively represented by waveforms 301, 302, 303, 304, and 305) relative to that of a conventional single layer polarization grating (represented by waveform 310). As shown in FIG. 3A, for angular shifts $\phi$ of less than about 45° (illustrated by waveforms 301 and 302), the spectral response of the corresponding multi-layer polarization gratings oscillate faster than that of the single layer polarization grating (illustrated by waveform 310), which results in a degradation in operational bandwidth relative to that of the single layer polarization grating. However, for angular shifts $\phi$ between about 45° and about 90° (illustrated by waveforms 303 and 304), the spectral response of the corresponding multi-layer polarization gratings is significantly broader than that of the single layer polarization grating shown by waveform 310. As such, multi-layer polarization gratings having angular shifts $\phi$ between about 45° and about 90° may offer greater diffraction efficiency than a single polarization grating.

Figure 3B:
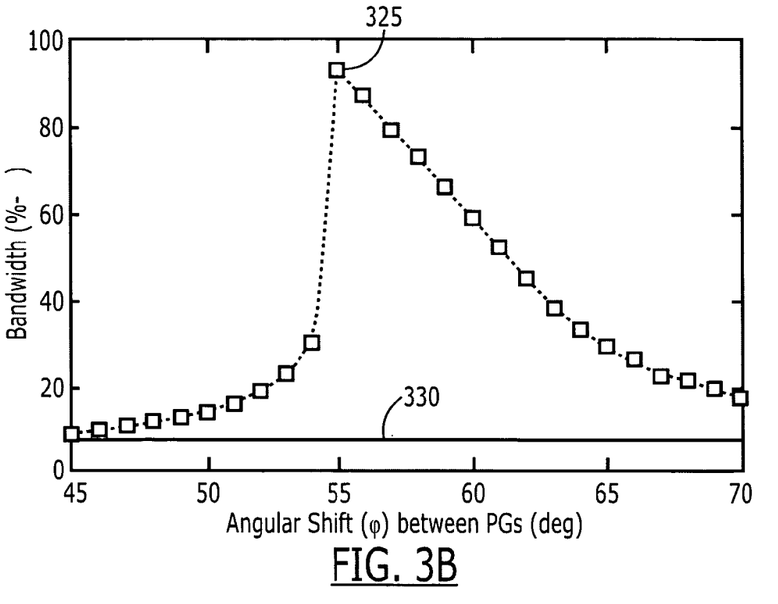

FIG. 3B illustrates relationships between the angular shift $\phi$ and operational bandwidth (as a percentage relative to a center wavelength $\lambda_0$) in multi-layer polarization gratings according to some embodiments of the present invention. The spectral range $\Delta\lambda$ (in units of wavelength) indicates the range of wavelengths over which the total first-order diffraction $\Sigma\eta_{-1}$ is $\geqq 99.5\%$. The normalized bandwidth $\Delta\lambda/\lambda_0$ (in units of %) is defined as the ratio of the spectral range to the center wavelength $\lambda_0$. As shown in FIG. 3B, a maximum bandwidth $\Delta\lambda_{max}$ 325 of about 90% of the center wavelength $\lambda_0$ occurs at an angular shift $\phi$ of about 55°. In contrast, the maximum bandwidth $\Delta\lambda_{SinglePG}$ 330 for a conventional single polarization grating is about 6.8% of the wavelength $\lambda_0$.

Figure 4:
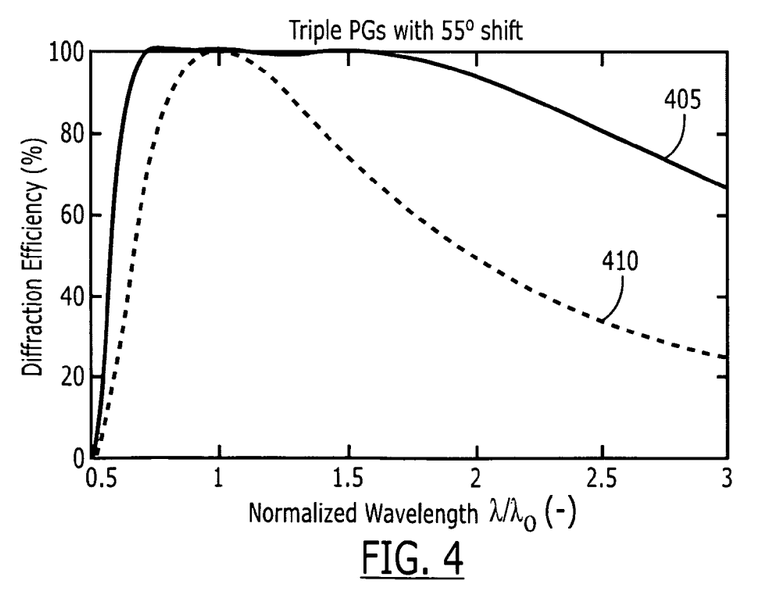

FIG. 4 illustrates the differences in spectral response of a multi-layer polarization grating having an angular shift $\phi$ of about 55° according to some embodiments of the preset invention relative to a conventional single polarization grating. More particularly, as shown in FIG. 4, the first order diffraction efficiency $\eta_{-1}$ for a multi-layer polarization grating having an angular shift $\phi$ of about 55° (illustrated by waveform 405) is significantly greater than the first order diffraction efficiency $\eta_{-1}$ of a single polarization grating (denoted by waveform 410), as evidenced by the broader spectral response. It is to be understood, however, that the angular shift $\phi$ may vary in some embodiments, for example, based on the use of different liquid crystal materials and/or different birefringence values. For example, in some embodiments, the angular shift $\phi$ may be greater than 0° but less than 180°. Accordingly, multi-layer polarization gratings according to some embodiments of the present invention may provide a significant improvement in operational bandwidth as compared to conventional single polarization gratings.

Figure 5A:
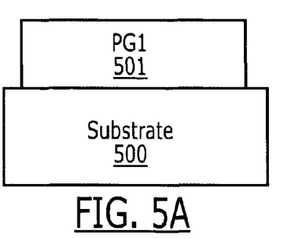
FIGS. 5A-5E are cross-sectional views illustrating methods of fabricating multi-layer polarization gratings according to some embodiments of the present invention.
Figure 5B:
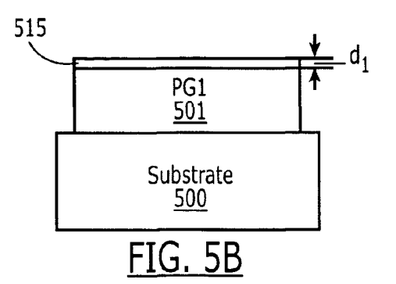
Figure 5C:
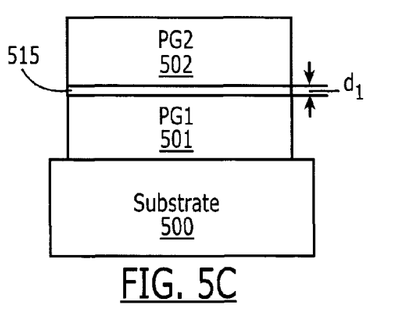
Figure 5D:
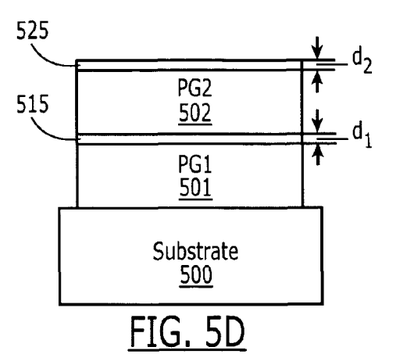
Figure 5E:
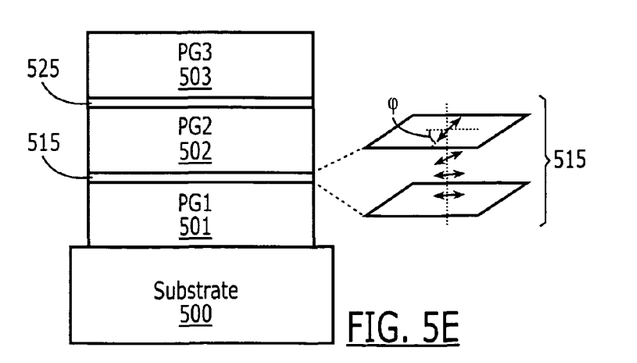

FIGS. 5A-5E are cross-sectional views illustrating methods of fabricating multi-layer polarization gratings according to some embodiments of the present invention. Referring now to FIG. 5A, a first polarization grating PG1 501 is formed on a substrate 500. For example, the first polarization grating PG1 501 may be formed using holography techniques on a transmissive or transparent substrate 500. The first polarization grating PG1 501 may be a polymerizable liquid crystal PG layer. As shown in FIG. 5B, a relatively thin chiral polymerizable liquid crystal layer C1 515 is formed on the first polarization grating PG1 501. For example, in some embodiments, the layer C1 515 may be a thin chiral polymerizable liquid crystal layer with about a +55° twist. In other words, the layer C1 515 may be doped with a chiral molecule (i.e., an asymmetric molecule having different left-handed and right-handed forms) such that the orientation of the molecules in the layer C1 515 may be "twisted" by an angle $\phi$ of about 55° over the thickness $d_1$ between opposing faces of the layer C1 515 (as illustrated in FIG. 5E). A second polarization grating PG2 502 is assembled on the chiral polymerizable liquid crystal layer C1 515, as shown in FIG. 5C. As such, the second polarization grating PG2 502 may be shifted in phase relative to the first polarization grating PG1 501 based on the amount of chiral twist in the layer C1 515. The amount of relative angular shift $\phi$ may also depend on the distance between the first and second polarization gratings PG1 501 and PG2 502, i.e., based on the thickness of the layer C1 515. As shown in FIG. 5D, a relatively thin chiral polymerizable liquid crystal layer C2 525 having an opposite handedness than that of the layer C1 515 is formed on the second polarization grating PG2 502. For example, in some embodiments, the layer C2 525 may be a thin chiral polymerizable liquid crystal layer with about a −55° twist over the thickness $d_2$ between opposing faces of the layer C2 525. A third polarization grating PG3 503 is assembled on the chiral polymerizable liquid crystal layer C2 525, as shown in FIG. 5E, and is similarly but oppositely shifted in phase relative to the second polarization grating PG2 502 based on the amount of chiral twist in the layer C2 525. As such, the periodic molecular orientations of the first and third polarization gratings PG1 501 and PG3 503 may be in-phase. Accordingly, in some embodiments of the present invention, a multi-layer polarization grating may be formed completely with polymerizable liquid crystal materials and a single substrate. However, in other embodiments, different materials and/or substrates may be used. For example, the thicknesses $d_1$ and $d_2$ of the layers C1 515 and C2 525 may be different, and as such, the periodic molecular orientations of the first and third polarization gratings PG1 501 and PG3 503 may be out of phase in some other embodiments.

Figure 6A:
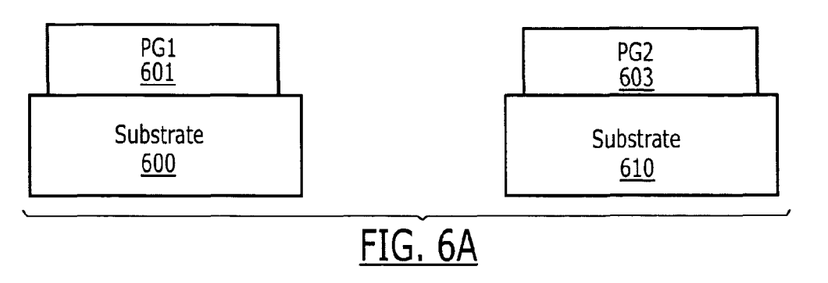
FIGS. 6A-6C are cross-sectional views illustrating methods of fabricating multi-layer polarization gratings according to further embodiments of the present invention.
Figure 6B:
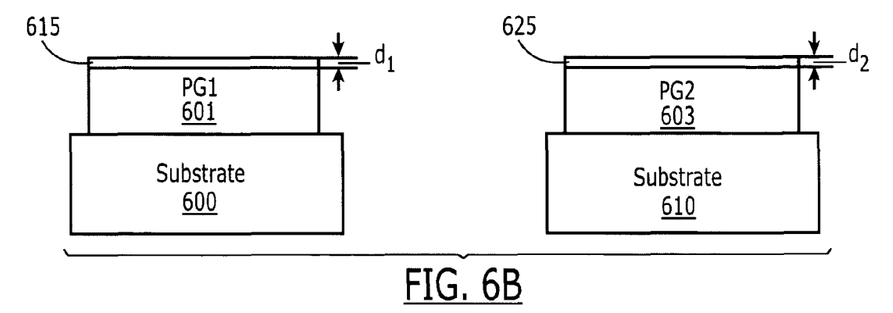
Figure 6C:
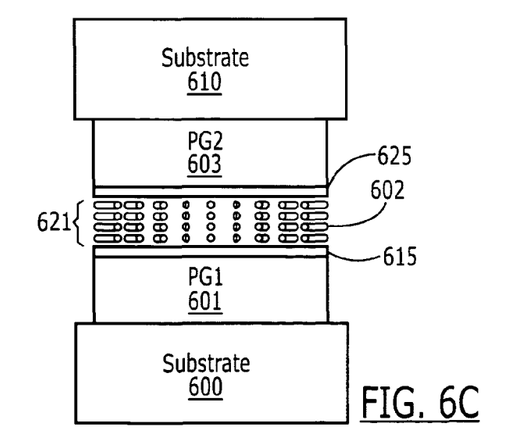

FIGS. 6A-6C are cross-sectional views illustrating methods of fabricating multi-layer polarization gratings according to further embodiments of the present invention. Referring now to FIG. 6A, first and second polarization gratings PG1 601 and PG2 603 are respectively formed on first and second substrates 600 and 610. For example, the first and/or second polarization gratings PG1 601 and PG2 603 may be formed using well-known holography techniques that will not be discussed further herein. Each substrate may also include a transparent conductive electrode, such as an indium-tin-oxide (ITO) electrode (not shown). As shown in FIG. 6B, first and second chiral polymerizable liquid crystal layers C1 615 and C2 625 of opposite handedness are respectively formed on the first and second polarization gratings PG1 601 and PG2 602. For example, the first layer C1 615 may be a thin chiral polymerizable liquid crystal layer with about a +55° twist, while the second layer C2 625 may be a thin chiral polymerizable liquid crystal layer with about a −55° twist. As shown in FIG. 6C, the first and second substrates 600 and 610 are assembled to provide a substantially uniform cell gap 621 therebetween and filled with a liquid crystal material to form a switchable liquid crystal layer 602. The cell gap 621 may be greater than the half-wave retardation thickness for light used in operation of the multi-layer polarization grating, for example, about 2 micrometers (μm). However, in other embodiments, the cell gap 621 may be less than or equal to the half-wave retardation thickness. As such, the molecules of the liquid crystal layer are aligned according to the chiral twist in the layers C1 615 and C2 625 to provide an angular shift $\phi$ relative to the molecular orientation of the polarization gratings PG1 601 and PG2 603. Accordingly, some embodiments of the present invention may provide a switchable pixel structure with broadband high contrast and achromatic operation.

Thus, according to some embodiments of the present invention, achromatic (broadband) diffraction in the liquid crystal polarization grating may be achieved by a three-layer polarization grating configured to provide a fixed and/or variable angular shift therebetween. Such a multi-layer polarization grating can be fabricated using known thin-film techniques and/or known liquid crystal materials to create an improved spatial-light-modulator element, for example, for use in polarization-independent microdisplays such as portable projection displays, consumer TV sets, real-time holography, etc. Moreover, in some instances, multi-layer polarization gratings according to some embodiments of the present invention may increase high contrast modulation over a wavelength range of up to about 90% of a desired center wavelength, which may result in up to a 1200% improvement as compared to conventional single polarization gratings. Accordingly, in display applications, image quality may be significantly improved.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. For example, although described above primarily with reference to a second polarization grating layer including a periodic molecular structure that is offset relative to that of first and third polarization grating layers, the periodic molecular structures of the first and third polarization grating layers may also be offset relative to one another. Moreover, the substrates described herein may include one or more electrodes on surfaces thereof, for instance, provided by a transparent indium-tin-oxide (ITO) coating on the substrates. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed:

1. A multi-layer polarization grating, comprising:
    a first polarization grating layer comprising a first periodic molecular structure;
    a second polarization grating layer on the first polarization grating layer, the second polarization grating layer comprising a second periodic molecular structure wherein, along a first interface between the first and second polarization grating layers, the second periodic molecular structure is offset relative to the first periodic molecular structure in a direction parallel to the first interface; and
    a third polarization grating layer on the second polarization grating layer such that the second polarization grating layer is between the first and third polarization grating layers, the third polarization grating layer comprising a third periodic molecular structure wherein, along a second interface between the second and third polarization grating layers, the third periodic molecular structure is offset relative to the second periodic molecular structure in a direction parallel to the second interface.

2. The multi-layer polarization grating of claim 1, wherein the second periodic molecular structure is offset relative to the first periodic molecular structure such that the first and second periodic molecular structures are out of phase by a first relative angular shift, and wherein the third periodic molecular structure is offset relative to the second periodic molecular structure such that the second and third periodic molecular structures are out of phase by a second relative angular shift.

3. The multi-layer polarization grating of claim 2, wherein a local nematic director orientation in the second polarization grating layer has the first angular shift relative to a local nematic director orientation in the first polarization grating layer, wherein a local nematic director orientation in the third polarization grating layer has the second angular shift relative to the local nematic director orientation in the second polarization grating layer, and wherein the second angular shift is different than the first angular shift.

4. The multi-layer polarization grating of claim 2, wherein the third periodic molecular structure is oppositely offset relative to the second periodic molecular structure than the second periodic molecular structure is offset relative to the first periodic molecular structure.

5. The multi-layer polarization grating of claim 4, wherein the second angular shift comprises an opposite angle than the first angular shift such that the first and third periodic molecular structures are in-phase.

6. The multi-layer polarization grating of claim 5, wherein the first angular shift is greater than 0° but less than 180°.

7. The multi-layer polarization grating of claim 5, wherein the first angular shift is about +55° to about +56°, and wherein the second angular shift is about −55° to about −56°.

8. The multi-layer polarization grating of claim 4, wherein the third periodic molecular structure of the third polarization grating layer is out of phase relative to the first periodic molecular structure of the first polarization grating layer.

9. The multi-layer polarization grating of claim 2, further comprising:
    a first chiral polymerizable liquid crystal layer on the first polarization grating layer between the first polarization grating layer and the second polarization grating layer,
    wherein the first chiral polymerizable liquid crystal layer is configured to shift the second periodic molecular structure of the second polarization grating layer relative to the first periodic molecular structure of the first polarization grating layer by the first angular shift.

10. The multi-layer polarization grating of claim 9, further comprising:
    a second chiral polymerizable liquid crystal layer on the third polarization grating layer between the third polarization grating layer and the second polarization grating layer,
    wherein the first and second chiral polymerizable liquid crystal layers respectively include chiral molecules therein, and wherein the chiral molecules of the second chiral polymerizable liquid crystal layer are of an opposite handedness than the chiral molecules of the first chiral polymerizable liquid crystal layer such that the second chiral polymerizable liquid crystal layer is configured to oppositely shift the third periodic molecular structure of the third polarization grating layer relative to the second periodic molecular structure of the second polarization grating layer by the second angular shift.

11. The multi-layer polarization grating of claim 10, wherein the first chiral polymerizable liquid crystal layer comprises about a +55 degree twist over a thickness between opposing faces thereof, and wherein the second chiral polymerizable liquid crystal layer comprises about a −55 degree twist over a thickness between opposing faces thereof.

12. The multi-layer polarization grating of claim 1, further comprising:
    a first substrate including a first electrode on the first polarization grating layer; and
    a second substrate including a second electrode on the third polarization grating layer,
    wherein the second polarization grating layer comprises a non-reactive liquid crystal layer.

13. The multi-layer polarization grating of claim 12, wherein the second polarization grating layer comprises a nematic liquid crystal layer.

14. The multi-layer polarization grating of claim 1, wherein the second polarization grating layer comprises a polymerizable liquid crystal layer.

15. A method of fabricating a multi-layer polarization grating, the method comprising:
    forming a first polarization grating layer comprising a first periodic molecular structure;
    forming a second polarization grating layer on the first polarization grating layer, the second polarization layer comprising a second periodic molecular structure such that, along a first interface between the first and second polarization grating layers, the second periodic molecular structure is offset relative to the first periodic molecular structure in a direction parallel to the first interface; and forming a third polarization grating layer on the second polarization grating layer such that the second polarization grating layer is between the first and third polarization grating layers, the third polarization grating comprising a third periodic molecular structure such that, along a second interface between the second and third polarization grating layers, the third periodic molecular structure is offset relative to the second periodic molecular structure in a direction parallel to the second interface.

16. The method of claim 15, wherein forming the second and third polarization grating layers comprises:
forming the second polarization grating layer on the first polarization grating layer such that the first and second periodic molecular structures are out of phase by a first relative angular shift; and
forming the third polarization grating layer on the second polarization grating layer such that the second and third periodic molecular structures are out of phase by a second relative angular shift.

17. The method of claim 16, wherein forming the second and third polarization grating layers further comprises:
forming the second polarization grating layer on the first polarization grating layer such that a local nematic director orientation in the second polarization grating layer has the angular shift relative to a local nematic director orientation in the first polarization grating layer; and
forming the third polarization grating layer on the second polarization grating layer such that a local nematic director orientation in the third polarization grating layer has the second angular shift relative to the local nematic director orientation in the second polarization grating layer,
wherein the second angular shift is different than the first angular shift.

18. The method of claim 16, wherein forming the third polarization grating further comprises:
forming the third polarization grating layer on the second polarization grating layer such that the third periodic molecular structure is oppositely offset relative to the second periodic molecular structure than the second periodic molecular structure is offset relative to the first periodic molecular structure.

19. The method of claim 16, wherein the second angular shift comprises an opposite angle than the first angular shift such that the first and third periodic molecular structures are in-phase.

20. The method of claim 19, wherein the first angular shift is greater than 0 ° but less than 180 °.

21. The method of claim 19, wherein the first angular shift is about +55 ° to about +56 °, and wherein the second angular shift is about −55° to about −56 °.

22. The method of claim 18, wherein forming the third polarization grating layer comprises:
forming the third polarization grating layer such that the third periodic molecular structure is out of phase relative to the first periodic molecular structure.

23. The method of claim 15, further comprising:
forming a first chiral polymerizable liquid crystal layer on the first polarization grating layer prior to forming the second polarization grating layer thereon,
wherein the first chiral polymerizable liquid crystal layer is configured to shift the second periodic molecular structure of the second polarization grating layer relative to the first periodic molecular structure of the first polarization grating layer by the first angular shift.

24. The method of claim 23, further comprising:
forming a second chiral polymerizable liquid crystal layer on the third polarization grating layer,
wherein the first and second chiral polymerizable liquid crystal layers respectively include chiral molecules therein, and wherein the chiral molecules of the second chiral polymerizable liquid crystal layer are of an opposite handedness than the chiral molecules of the first chiral polymerizable liquid crystal layer such that the second chiral polymerizable liquid crystal layer is configured to oppositely shift the third periodic molecular structure of the third polarization grating layer relative to the second periodic molecular structure of the second polarization grating layer by the second angular shift.

25. The method of claim 24, wherein the first chiral polymerizable liquid crystal layer comprises about a +55 degree twist over a thickness between opposing faces thereof, and wherein the second chiral polymerizable liquid crystal layer comprises about a −55 degree twist over a thickness between opposing faces thereof.

26. The method of claim 24, wherein forming the second chiral polymerizable liquid crystal layer comprises:
forming the second chiral polymerizable liquid crystal layer on the second polarization grating layer; and then
forming the third polarization grating layer on the second chiral polymerizable liquid crystal layer,
wherein the second polarization grating layer comprises a reactive mesogen layer.

27. The method of claim 24, wherein forming the second chiral polymerizable liquid crystal layer comprises:
forming the second chiral polymerizable liquid crystal layer on the third polarization grating layer prior to forming the second polarization grating layer; and
assembling the third polarization grating layer including the second chiral polymerizable liquid crystal layer thereon adjacent the first polarization layer including the first chiral polymerizable liquid crystal layer thereon to define a gap between the first and second chiral polymerizable liquid crystal layers,
wherein forming the second polarization grating layer comprises forming a non-reactive liquid crystal layer in the gap between the first and second chiral polymerizable liquid crystal layers such that the second periodic molecular structure of the second polarization grating layer is shifted relative to the first periodic molecular structure by the first angular shift and is shifted relative to the third periodic molecular structure by the second angular shift.

28. The method of claim 27, wherein the second polarization grating layer comprises a nematic liquid crystal layer.

29. The method of claim 27, wherein forming the first and third polarization grating layers comprises:
forming the first polarization layer on a first substrate including a first electrode; and
forming the third polarization layer on a second substrate including a second electrode,
wherein assembling the third polarization layer adjacent the first polarization layer comprises assembling the first substrate adjacent the second substrate to define the gap between the first and second chiral polymerizable liquid crystal layers.

30. The method of claim 27, wherein the gap between the first and second chiral polymerizable liquid crystal layers comprises about a half-wave retardation thickness.

* * * * *